United States Patent [19]

Grado

[11] 4,174,111

[45] Nov. 13, 1979

[54] COMPRESSIVE PIVOT SUSPENSION SYSTEM FOR AN ELECTROMAGNETIC CARTRIDGE

[76] Inventor: Joseph F. Grado, 4614 Seventh Ave., Brooklyn, N.Y. 11220

[21] Appl. No.: 612,770

[22] Filed: Sep. 12, 1975

Related U.S. Application Data

[63] Continuation of Ser. No. 414,983, Nov. 12, 1973, abandoned.

[51] Int. Cl.[2] .................. G11B 3/52

[52] U.S. Cl. .................. 274/37

[58] Field of Search .................. 274/37; 179/100.41 D, 179/100.41 M, 100.41 K

[56] References Cited

U.S. PATENT DOCUMENTS

| | | | |
|---|---|---|---|
| 1,502,764 | 7/1924 | Clark et al. | 274/37 |
| 3,683,128 | 8/1972 | Grado | 179/100.41 K |
| 3,694,586 | 9/1972 | Grado | 274/37 X |
| 3,881,073 | 4/1975 | Grado | 274/37 X |

*Primary Examiner*—Charles E. Phillips

[57] ABSTRACT

In a combined stylus and generator system, the combination with a stylus adapted to operate with a record groove and a generator moving in response to the movement of said stylus means for suspending the stylus and generator system for universal movement. The means for suspending the system includes a pivot member connected to a rigid support and seated in an elastomeric socket member proximate the end of the stylus lever. The pivot member is preloaded in the elastomeric socket member by a second elastomeric member coupled between the rear of the stylus lever and the support. Lateral motion of the generator system is damped by non-linear compressive forces in the preloaded elastomeric socket member, while forces on the stylus causing the generator system to swing about the pivot member are damped by opposing shear compliance forces in the elastomeric socket member which act to return the stylus to its neutral position.

11 Claims, 13 Drawing Figures

FIG. 2.
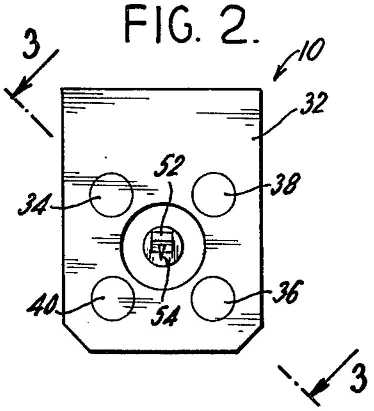
FIG. 1.
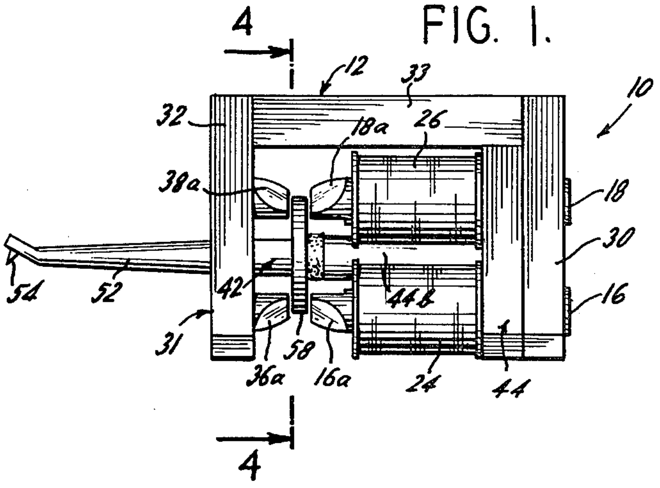
FIG. 3.
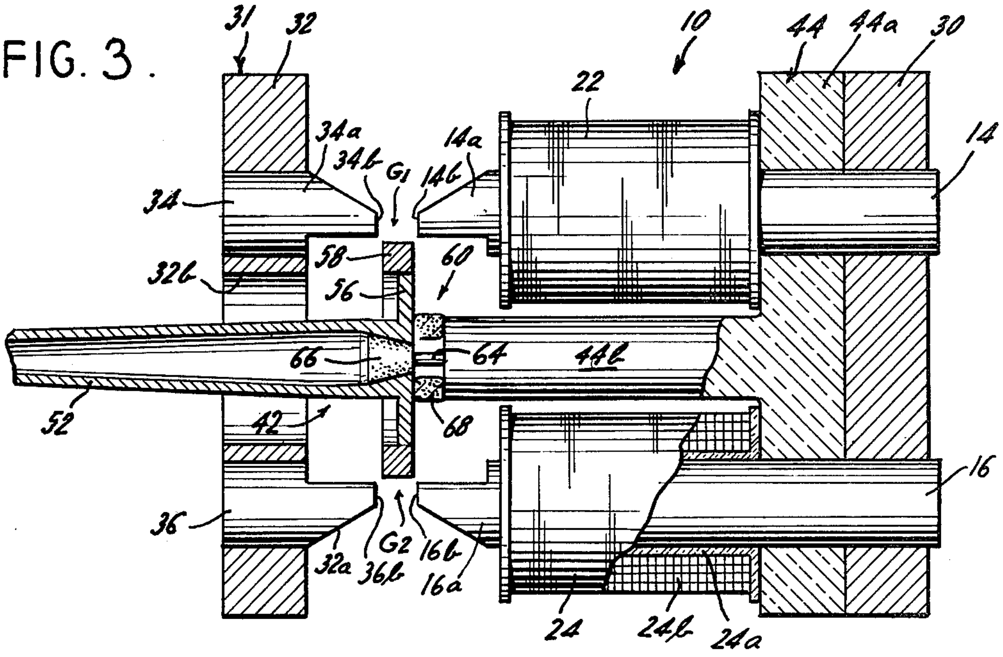
FIG. 5.
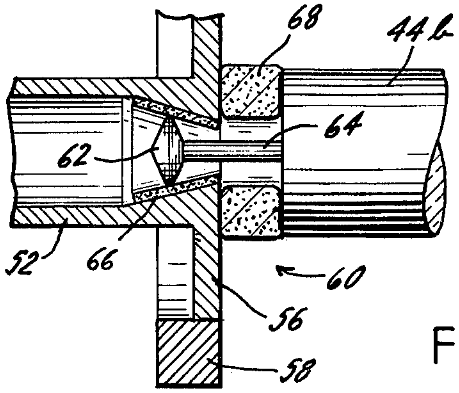
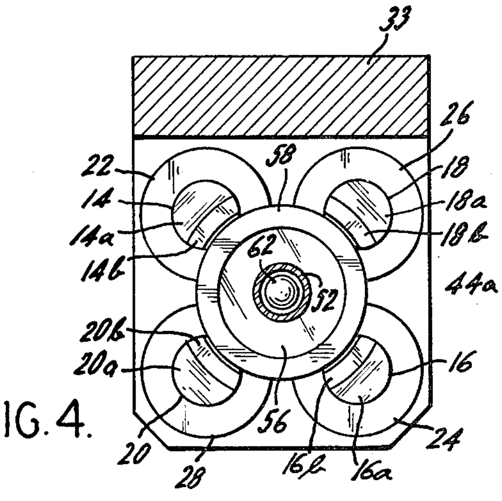
FIG. 4.

COMPRESSIVE PIVOT SUSPENSION SYSTEM FOR AN ELECTROMAGNETIC CARTRIDGE

This is a continuation of application Ser. No. 414,983 filed Nov. 12, 1973, now abandoned.

BACKGROUND OF THE INVENTION

The present invention relates generally to phonograph pickups, and in particular to an improved phonograph pickup or electromagnetic cartridge for the reproduction of monaural, stereophonic and quadraphonic sound recordings.

In a typical cartridge, there is provided a support usually in the form of a cartridge housing on which is mounted a stylus cantilever-generator assembly which includes a supported stylus lever having the requisite system compliance such that the stylus thereof may track the usual 45°–45° groove of a record disc. An appropriate magnetic structure is provided including first and second pairs of coils, with each pair typically being connected in series. The pairs of coils have signals induced therein which are related to the modulations derived by the stylus from the record groove. Signals or voltages are induced in the coils through the provision of a ferrous generator which is disposed in proximity to magnetic gaps defined by the permanent magnet and pole pieces of the magnetic structure.

In the manufacture of pickups for sound reproduction from monaural, stereophonic and quadraphonic records, it is important for the combined stylus lever-generator system to accurately translate stylus motion to the generator without the introduction of spurious generator motions which result in distortion. If the particular suspension means employed for the generating system introduced displacements of the effective center of generator motion due to transmitted stylus motion, the undesired generator motion will manifest itself as improper signal reproduction resulting in distortion which will vary over the frequency response of the pickup. For example, if incident to a change in frequency or amplitude of stylus motion there is a tendency for the particular selected pivot point to wander, unwanted and unpredictable motion of the generator will result causing spurious signal generations (distortions) which will vary randomly over the frequency and amplitude range of the cartridge.

One popular type of pivot for the stylus in such cartridges in an O-ring suspension wherein the stylus is supported by the generator; and the generator is received within a stationary O-ring and appropriately anchored such that an effective stylus pivot can be considered to be located in the center plane of the O-ring. Using this type of O-ring suspension, the effective pivot will be displaced axially along the stylus lever, dependent upon the interaction forces of stylus and generating masses, stylus beam and dynamic amplitudes of the combined parts. It is virtually impossible to eliminate such shifting or indeed to predict the pattern thereof over the frequency range of a cartridge. It is generally understood that this will result in distortion.

In another popular type of pivot system, the stylus lever having a generator mounted thereon is anchored on an axial pivot secured to a base support, which axial pivot is preloaded by an elastomer placed in axial compression between the stylus lever-generator assembly and the base support. When in a static or neutral position, the pivot for this type of system is axially positioned betwen the generator and the base support. During operation, the interacting forces which cause the pivoting position to shift and result in spurious signal generations are potentially even more complex. In this particular configuration, spurious motions of the generator are minimized; but inherently there is a tendency for the generator to be displaced at right angles to the axial support providing the pivot. The foregoing shifting and rotation of the generator introduces offsetting moments on the pivot which manifest themselves as effective displacements of the pivot, introducing further distortions.

An additional effect which comes about as a result of shifts in the effective pivot for the stylus lever is the introduction of the stylus of rapidly changing dynamic mass effects. The shifting of the pivoting position causes the elastomeric materials to act as resistive elements, rather than to serve the intended function of solely providing the pivotal support, thereby resulting in an effective increase of dynamic mass at the stylus. Such increase in dynamic stylus mass manifests itself as a relatively large dynamic mass for a correspondingly small static mass and notwithstanding such small static mass, severely limits the frequency response and increases distortion parameters of the pickup. Restriction of such frequency response and increased distortion is detrimental to such pickup performance, particularly in recently introduced systems for the reproduction of quadraphonic sound.

Accordingly, I have invented a new and improved suspension system for an electromagnetic cartridge which separates the various undesirable elements and allows them to be controlled individually with a relatively high degree of accuracy. With such separate control, it is possible to determine and program the dynamic effects necessary for optimum mechanical performance. With my new system, displacement of the pivot of the stylus lever is substantially reduced and highly controlled regardless of the frequency or mass deviations in the system.

SUMMARY OF THE INVENTION

In accordance with an illustrative embodiment demonstrating objects and features of the present invention, there is provided for an electromagnetic cartridge for the reproduction of sound recordings from a record having a record groove, an improved system for suspending a stylus lever with a stylus adapted to track the record groove. The suspension system includes a support, a pivot member operatively connected to the support and means for mounting said stylus lever on said pivot member including an elastomer interposed between the pivot member and the stylus lever. The pivot member is constructed and arranged to bear against the elastomer in a manner to substantially damp out lateral motion of the stylus lever while the stylus lever swings about the pivot in a controlled manner in response to the stylus tracking the record groove. By interposing an elastomer between the pivot member and the stylus lever and arranging the pivot member to bear against the elastomer, compressive forces are exerted on the elastomer which effectively oppose and damp out unwanted and unpredictable motions of the stylus lever which heretofore caused signal distortion, while allowing the stylus lever to swing about the pivot member in response to forces on the stylus from the record groove to provide substantially distortion free reproduction of the recorded information.

BRIEF DESCRIPTION OF THE DRAWINGS

FIG. 1 is a longitudinal elevational view of a typical cartridge or pickup embodying features of the present invention, shown removed from the normal cartridge housing that would be associated therewith;

FIG. 2 is a front elevational view taken from the left of FIG. 1;

FIG. 3 is a sectional view taken at substantially 45° to the horizontal and along lines 3—3 of FIG. 2 and looking in the direction of the arrows with part broken away and sectioned and on an enlarged scale;

FIG. 4 is a sectional view taken substantially along a line 4—4 of FIG. 1 and looking in the direction of the arrows;

FIG. 5 is an enlarged view of a portion of FIG. 3 showing in more detail the suspension system of the invention.

DESCRIPTION OF THE PREFERRED EMBODIMENT

Figure 6:
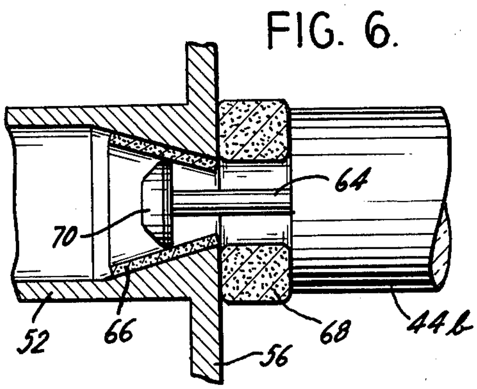
FIGS. 6-13 are enlarged views similar to FIG. 5 and showing alternate embodiments of the suspension system.

Referring now specifically to the drawings, and in particular to FIG. 1, there is shown an improved electromagnetic cartridge or pickup for the reproduction of monaural, stereophonic or quadraphonic sound generally designated by the reference numeral 10, which may be removably mounted within an appropriate housing which in turn is mounted on the tone arm of a turntable or record player, as is generally understood. For a typical mounting arrangement, reference may be made to U.S. Pat. No. 3,694,586 issued Sept. 26, 1972 entitled "Toroidal Armature Stereophonic Pickup".

Cartridge 10 includes a balanced magnetic structure 12 which includes four rear pole pieces 14, 16, and 18, 20 formed with tapered rear pole piece extensions 14*a*, 16*a*, and 18*a*, 20*a* respectively terminating in forwardly facing pole piece faces 14*g*, 16*b* and 18*b*, 20*b*. Pole pieces 14, 16 provide a first diametrically opposed pair having their longitudinal center lines in a substantially common plane at 45° to the horizontal (see 45° section of FIG. 3); and pole pieces 18, 20 provide a second diametrically opposed pair in which the pole pieces have their longitudinal center lines in a substantially common plane at 45° to the horizontal and at right angles to the first pair. A first pair of coils 22, 24, is mounted on the first pair of pole pieces 14, 16 and connected in voltage adding and hum canceling relation to each other and a similar second pair of coils 26, 28 is mounted in the second pair of pole pieces 18, 20 and connected in voltage adding and hum canceling relation to each other. Typically, each of the coils 22, 24, and 26, 28 includes a coil bobbin, such as 24*a*, which is fabricated of a non-ferrous material, and a coil proper, such as 24*b*. Opposed pairs of coils are of substantially identical configuration to avoid introducing any electrical imbalance in the coil arrangements and in the symmetry.

The plural pole pieces 14, 16 and 18, 20 are part of the balanced magnetic structure 12 which also includes a rear magnetic plate 30 serving as a pole piece support (see FIGS. 1 and 3). A front magnetic member generally designated by the reference number 31 includes front magnetic plate 32 disposed in spaced parallel relation to the rear magnetic plate 30 and front pole pieces 34, 36 and 38, 40 supported in cooperative relation with rear pole pieces 14, 16 and 18, 20 respectively. The front pole pieces are formed with rearwardly extending tapered front pole piece extensions 34*a*, 36*a*, and 38*a*, 40*a* which terminate in rearwardly facing pole piece faces 34*b*, 36*b* and 38*b*, 40*b*. Forwardly facing faces 14*b*, 16*b* and 18*b*, 20*b* of the rear pole piece extensions and rearwardly facing faces 34*b*, 36*b* and 38*b*, 40*b* of the front pole piece extensions cooperate to define four operating gaps symmetrically disposed about the longitudinal axis of the pickup with front and rear pole extension faces 14*b*, 34*b* defining a gap $G_1$ and front and rear pole extension faces 16*b*, 36*b* defining a gap $G_2$. Similarly, third and fourth operating gaps are formed between pole extension faces 18*b*, 38*b* and 20*b*, 40*b*. For a greater understanding of the cooperative effects and improvements effected by this arrangement of front and rear pole pieces, refer to my copending application entitled REPLACEABLE GENERATOR MODULE, filed on even date herewith. Interposed between front magnetic plate 32 and rear magnetic plate 30 is permanent magnet 33 which completes the balanced magnetic structure.

Extending axially of the pickup 10 and symmetrically disposed with respect to the magnetic structure 12 is a stylus lever-generator assembly, generally designated by the reference numeral 42, which is suspended from a support generally designated by reference numeral 44. As seen in FIG. 3, the support 44 may be fabricated of a single molded plastic piece and includes a base 44*a* co-extensive with the rear magnetic plate 30 through which the pole pieces pass and axially extending post 44*b* extending symmetrically between the pole pieces.

The stylus lever-generator assembly 42 includes stylus lever 52 which projects through central cut-out 32*b* in front magnetic plate 32, and near its forward end carries the usual tip or stylus 54. At its rearward end, stylus lever 52 is formed with outwardly extending shoulders 56 to which generator 58 is secured.

Serving to suspend the stylus lever-generator assembly 42 from the support 44 is the stylus lever-generator suspension system generally designated by reference numeral 60, and shown in greatest detail in FIG. 5. The suspension system 60 includes a pivot member 62 positioned inside stylus lever 52 and connected to one end of axially extending shaft 64 which has its opposite end operatively connected to support 44*b*. The pivot member provides a pivot for the stylus lever and in the preferred embodiment, is in the form of two cones joined at their respective bases with one apex rounded and the other apex connected to shaft 64. Interposed between the pivot member and the inner wall of stylus lever 52 is an elastomeric material 66 which forms a socket for the pivot member. As shown, the elastomeric material 66 has a frusto-conical rear portion and a cylindrical forward portion. Disposed in axial compression between the forward end of axially extending post 44*b* and the rearward end of stylus lever 52 and surrounding shaft 64 is cylindrical elastomeric material 68 which preloads the suspension system by urging the stylus lever forward causing the pivot member to bear against elastomeric material 66 thereby compressing elastomeric member 66 along the area of contact. The pivot member is shaped to produce large compressive forces on the elastomeric material.

In operation, forces on the stylus caused by information recorded on the record groove cause motion in the stylus lever and generator. Unwanted lateral displacement and shifting of the system pivot which give rise to distortion are opposed and damped by the preloaded compressive forces on the elastomeric material 66 in the stylus lever thus substantially eliminating lateral movement of the stylus lever and generator. Forces on the stylus which act to swing the generator about the pivot member in response to the recorded information are opposed by oppositely directed shear compliance forces in the elastomeric material 66 which allow the stylus to accurately track the record groove while damping out unwanted pivotal motion of the generator and act to return the generator to its neutral position. Since shear compliance forces are present along the entire contact area the generator motions are damped out uniformly with a consequent reduction in signal distortion.

Turning now to FIGS. 6–13, there are shown a number of other embodiments of the suspension system of the invention. In these embodiments, elements which represent the same elements as shown in FIG. 5 are indicated by the same reference numerals. In addition, since the suspension systems of FIGS. 6–13 operate in essentially the same manner as the suspension system described above, the operation of these suspension systems will not be explained further in the interest of brevity.

Figure 10:
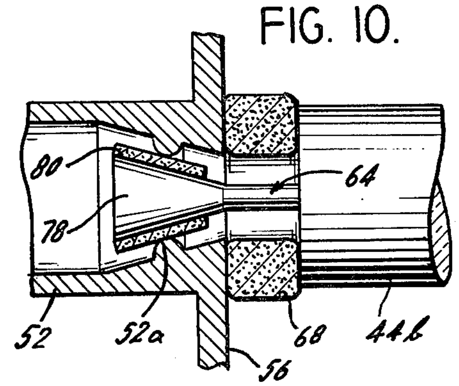
Figure 7:
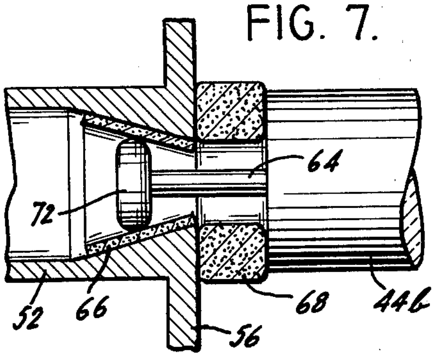
Figure 11:
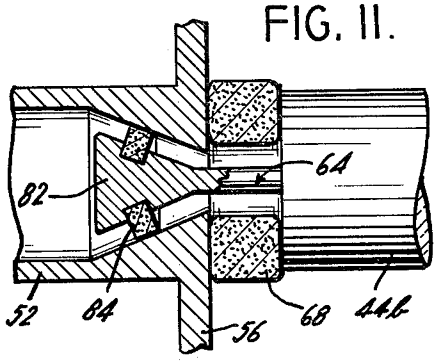
Figure 8:
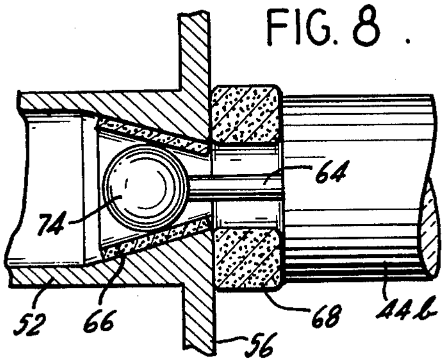
Figure 12:
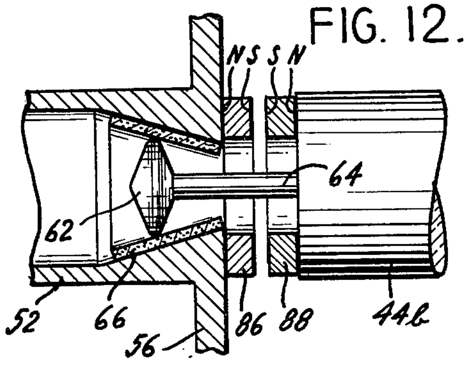
Figure 9:
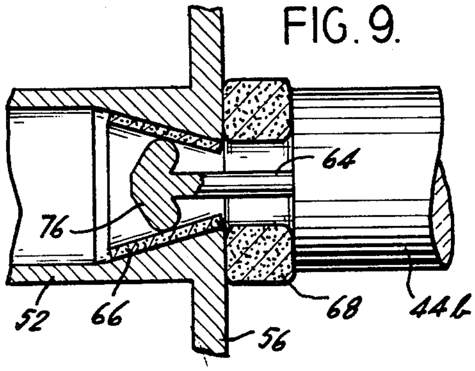
Figure 13:
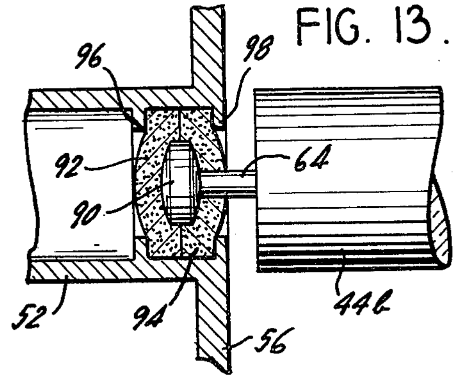

Turning now to FIG. 6, the pivot member 70 has frusto-conical front and rear sections and a rearwardly directed face attached to one end of shaft 64. The outer surface of the rear section is adapted to be in contact with the inner surface of elastomer 66. In the embodiment of FIG. 7, the pivot member 72 is oval shaped while in FIG. 8, a spherically shaped pivot member 74 is shown. FIG. 9 shows an oval pivot member 76 with the rearward end shaped to form rearwardly extending shoulders which are in contact with the elastomeric material 66. This configuration provides a decrease in the contact area between the pivot member and elastomeric material which increases the compressive forces on the material. Referring now to FIG. 10, there is shown frusto-conical pivot member 78 having its smaller diameter face rearwardly directed and attached to shaft 64 with elastomeric material 80 attached to its outer surface. Stylus lever 52 is formed with a ring *52a* extending inwardly from the inner wall at approximately right angles to the surface of pivot member 78. Preloading of the pivot member in this embodiment causes contact between ring *52a* and elastomer 80 which compresses the elastomer along the contact area. Still another embodiment of the invention is shown in FIG. 11 wherein frusto-conical pivot member 82 has a seat formed in its surface for receiving a tapered ring of elastomeric material 84 which is secured to the inner wall of stylus lever 52. FIG. 12 shows an alternate way of preloading the suspension system. In this embodiment, one permanent ring magnet 86 is attached to the stylus lever and another permanent ring magnet 88 is attached to the support. The magnets are arranged with like polarity poles facing each other across a small gap. The replusive forces between the like polarity magnetic poles urge the stylus lever forward thereby preloading the system. In the embodiment shown in FIG. 13, the pivot member 90 is embedded between two sections of elastomeric material 92,94 which are secured in an annular seat formed between shoulders 96, 98 in the interior of stylus lever 52.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the present invention.

What I claim is:

1. An electromagnetic cartridge for the reproduction of sound recordings including a support, a magnetic structure on said support including first, second, third and fourth pole pieces and a front magnetic member defining first and second operating gaps and third and fourth operating gaps, said first and second operating gaps extending symmetrically of a first plane and said third and fourth operating gaps extending symmetrically of a second plane and substantially at right angles to the first plane, a coil mounted on each pole piece, the coils for said first and second operating gaps being connected in series and the coils for the third and fourth operating gaps being connected in series, a rigid stylus lever having an interior wall and disposed symmetrically of said operating gaps having a stylus proximate one end, generator means rigidly and operatively connected to said stylus lever and disposed symmetrically with and proximate to said operating gaps, means for supending said stylus lever from said support including an elastomeric socket member formed on the interior wall of said stylus lever, a pivot member operatively connected to said support and operatively disposed in said elastomeric socket member and means operatively disposed between said stylus lever and said support and arranged to urge said pivot member to bear against said socket member.

2. A cartridge according to claim 1 wherein said means arranged to urge said pivot member to bear against said socket member comprises a second elastomer.

3. A cartridge according to claim 1 wherein said front magnetic member has first, second, third and fourth front pole piece extensions positioned in cooperative relationship with said first, second, third and fourth pole pieces to define said first and second operating gaps and said third and fourth operating gaps.

4. A cartridge according to claim 1 wherein said means arranged to urge said pivot member to bear against said socket member includes magnetic means operatively disposed between said stylus lever and said support and arranged to urge said pivot member to bear against said elastomer.

5. A cartridge according to claim 4 wherein said magnetic means includes a first permanent magnet attached to said stylus lever and a second permanent magnet attached to said support, said permanent magnets arranged with like magnetic poles proximate each other whereby the repulsive forces between the like magnetic poles urge said pivot member to bear against said elastomer.

6. A pivot arrangement utilized for symmetrical mechanical motion of an armature assembly for a phonograph transducer comprising a rigid support, a rigid stylus lever, a stylus rigidly mounted proximate the forward end of said stylus lever and a generator rigidly mounted proximate the rearward end of said stylus lever, said stylus lever having an internal wall, an elastomer socket member disposed on the inner wall of said stylus lever, a suspension system including a pivot member disposed in said socket member and a mounting rod having a rearward end mounted to said rigid support and a forward end mounted to said pivot member, the stylus lever, stylus, and generator arranged to pivot as a rigid structure about said pivot member in response to a force on said stylus.

7. The pivot arrangement of claim 6 further including an elastomer disposed between the rear surface of said stylus lever and said external support for maintaining a forwardly directed force on said stylus and stylus lever to force said pivot member into contact with said socket member.

8. The pivot arrangement of claim 6 wherein said stylus lever includes a mounting shoulder formed proximate the rearward end of said stylus lever, said generator being mounted on said mounting shoulder to form a rigid connection between said generator and stylus lever.

9. The pivot arrangement of claim 8 further including an elastomer disposed between the rear surface of said mounting shoulder and said rigid support for maintaining a forwardly directed force on said stylus lever to force said pivot member into contact with said socket member.

10. The pivot arrangement of claim 6 further including a magnetic means operatively disposed between said stylus lever and said support and arranged to urge said pivot member to bear against said elastomer.

11. The electromagnetic cartridge of claim 10 wherein said magnetic means includes a first permanent magnet attached to said stylus lever and a second permanent magnet attached to said support, said permanent magnets arranged with like magnetic poles proximate each other whereby the repulsive forces between the like magnetic poles urge said pivot member to bear against said elastomer.

* * * * *